Patented Feb. 24, 1942

2,274,611

UNITED STATES PATENT OFFICE 2,274,611

PRODUCTION OF CHLOROISOPRENE

Charles D. Hurd, Evanston, Ill., assignor to Commercial Solvents Corporation, New York, N. Y., a corporation of Maryland No Drawing. Application May 23, 1940,
Serial No. 336,715

9 Claims. (Cl. 260—654)

My invention relates to a process for the production of chloroisoprene, and more specifically to a process for the chlorination of dimethylethynylcarbinol to form chloroisoprene.

Chloroisoprene (2-chloro-3-methyl-1,3-butadiene) has previously been obtained by the hydrochlorination of 2-methyl-1-butene-3-yne. The latter compound, however, is usually prepared from dimethylethynylcarbinol, so it is evident that a single-step process for the production of chloroisoprene would be desirable. Previous attempts to chlorinate ethynylcarbinols, however, have indicated that the desired product could not be obtained in this manner. For example, Campbell et al. (J. A. C. S. 60, 2882) reported the chlorination of methylethynylcarbinol with the production of methylethylethynyl chloride rather than a chlorobutadiene derivative.

I have now found, however, that dimethylethynylcarbinol may be directly chlorinated to form chloroisoprene. The procedure required for this chlorination is extremely simple, and relatively high yields of chloroisoprene are obtainable. The mechanism of this reaction is not known, but evidently the hydroxyl group is removed by the chlorinating agent in one step of the process. In any event the class of chlorinating agents known to be suitable for the chlorination of alcohols, by the replacement of the hydroxyl group, may be used in my process for the production of chloroisoprene. Chlorinating agents of this class are referred to herein as hydroxyl-replacing chlorinating agents.

As examples of hydroxyl-replacing chlorinating agents, there may be mentioned hydrogen chloride gas, hydrochloric acid solutions, thionyl chloride, sulfuryl chloride, phosphorus oxychloride, and phosphorus pentachloride. I prefer, however, to employ hydrochloric acid either in gaseous form or in solution, and especially in the form of a relatively concentrated aqueous solution. The amount of chlorinating agent to be employed is not critical, but of course a sufficient quantity should be employed to provide at least one atom of chlorine per molecule of dimethylethynylcarbinol. In general I prefer to employ a considerable excess of the chlorinating agent—for example, from 2 to 5 moles of hydrochloric acid per mole of dimethylethynylcarbinol.

The reaction involved in my process may be illustrated as follows:

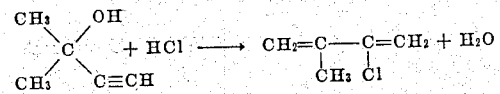

In view of the number of possible isomers of chloroisoprene which might theoretically be produced from these reactants, it is desirable to effect the reaction in the absence of any agents which might alter the course of the above reaction. For this reason I prefer to utilize reaction mixtures in which the only active components are dimethylethynylcarbinol and the chlorinating agent. Reaction mixtures consisting of only dimethylethynylcarbinol and the chlorinating agent, or mixtures of these components together with a mutual solvent, are very satisfactory for this purpose.

Standard procedures for liquid phase chlorination of alcohols may be utilized for the chlorination of dimethylethynylcarbinol. Some form of agitation during the reaction is usually desirable. Gaseous hydrogen chloride may be bubbled into the dimethylethynylcarbinol, either in the presence or absence of a solvent, or the dimethylethynylcarbinol may simply be added to a solution of hydrochloric acid while agitating the latter. Other chlorinating agents may be employed in accordance with known procedure for the chlorination of other alcohols. For example, thionyl chloride is suitably used in conjunction with pyridine. In general it may be said that my invention is not limited to any particular chlorinating procedure.

The temperature range for the chlorination reaction is relatively wide, and I have effected chlorination at temperatures ranging from 0° C. to the boiling point of the reaction mixture. Temperatures outside of this range would involve unnecessary expense, and are undesirable from this standpoint, but it is to be understood that these are not to be construed as limiting temperatures for my process. In general I prefer to employ a temperature below 50° C., and preferably as low a temperature as possible without unduly lowering the reaction rate. Unless it is desired to polymerize the chloroisoprene, or a portion thereof, simultaneously with its formation, it is desirable to effect the reaction at temperatures not substantially above ordinary room temperatures. For the production of maximum yields of chloroisoprene and minimum yields of polymers, I prefer to employ temperatures of 0° C. to 20° C.

The time of reaction will of course depend to a considerable extent upon the chlorinating agent employed. Thus, one may obtain chloroisoprene more rapidly when employing relatively concentrated hydrochloric acid solutions than when bubbling hydrogen chloride gas into the dimethylethynylcarbinol. In any case, prolonged reaction time tends to increase the yield of chloroisoprene, but also tends to form polymerization products. The optimum reaction time for obtaining maximum yield of chloroisoprene with minimum yield of polymers, in any particular case, may be determined by preliminary experiments.

At the conclusion of the reaction, chloroisoprene may be recovered by any suitable procedure, as, for example, by steam distillation. Here, again, low temperature is desirable to minimize polymerization, and I prefer to recover the product by vacuum distillation or vacuum steam distillation.

If desired, polymerization inhibitors may be incorporated in the mixture prior to distillation, or into the initial reaction mixture. Any of the class of materials known to inhibit the polymerization of unsaturated hydrocarbons may be employed for this purpose. The class of materials known as "gum inhibitors" for petroleum motor fuels are particularly suitable, as, for example, hydroquinone or trinitrobenzene. Such materials appear to be less effective for inhibiting the polymerization of chloroisoprene than for inhibiting polymerization of motor fuels, but they may be employed as a precautionary measure. As in the case of treating motor fuels, only relatively minute amounts of these materials need be employed.

My invention may be further illustrated by the following specific examples:

Example I

A solution of dimethylethynylcarbinol and pyridine (1.1 mole of pyridine per mole of dimethylethynylcarbinol) was maintained at 60° C. and thionyl chloride (1.1 mole per mole dimethylethynylcarbinol) was slowly added while stirring the solution. The reaction temperature was maintained for 3 hours, at the conclusion of which time the mixture was steam distilled. Chloroisoprene was recovered as a yellow oily layer in the distillate.

Example II

Dimethylethynylcarbinol was saturated with dry hydrogen chloride gas at 0° C., for 13 hours. The material was then dried over anhydrous potassium carbonate at 0° C., and vacuum distilled at 0.5–1.0 mm. Chloroisoprene was recovered as an oily distillate, distilling over a —10 to —35° C., and collected in a trap maintained at —80° C. This distillate amounted to 67% of the theoretitcal yield.

Example III

Dimethylethynylcarbinol was added to a 29% hydrochloric acid solution in a ratio of 1 mole of dimethylethynylcarbinol to 3 moles of hydrochloric acid, and the mixture was agitated at 20° C. for 15 minutes. Chloroisoprene was recovered by steam distillation as the oily layer of distillate. This material was a light yellow oil, having a refractive index $n20/D$ 1.4412, and was obtained in a yield of 69% of the theoretical yield.

Example IV

Dimethylethynylcarbinol was introduced into a 37% hydrochloric acid solution containing a trace of hydroquinone. The dimethylethynylcarbinol was added in a ratio of approximately 0.28 mole per mole of hydrochloric acid. The mixture was agitated for 30 minutes at approximately 20° C., and was then steam distilled. Chloroisoprene was recovered as the oily layer of the distillate in a yield of 73% of the theoretical yield.

It is to be understood, of course, that the above examples are merely illustrative, and do not limit the scope of my invention. As has previously been pointed out, any of the hydroxyl-replacing chlorinating agents or chlorinating procedures known to be suitable for the liquid phase chlorination of alcohols, may be used for the chlorination of dimethylethynylcarbinol. In general, it may be said that the use of any equivalents or modifications of procedure, which would naturally occur to those skilled in the art, is included within the scope of my invention.

My invention now having been described, what I claim is:

1. A process for the production of chloroisoprene, which comprises effecting reaction, in the liquid phase, in a reaction mixture in which the active components comprise essentially dimethylethynylcarbinol, and a hydroxyl-replacing chlorinating agent.

2. A process for the production of chloroisoprene, which comprises effecting reaction, in the liquid phase, and at a temperature below 50° C., in a reaction mixture in which the active components comprise essentially dimethylethynylcarbinol, and a hydroxyl-replacing chlorinating agent.

3. A process for the production of chloroisoprene, which comprises effecting reaction in the liquid phase, in a reaction mixture comprising essentially dimethylethynylcarbinol, and a hydroxyl-replacing chlorinating agent.

4. A process for the production of chloroisoprene, which comprises effecting reaction, in the liquid phase, and at a temperature below 50° C., in a reaction mixture comprising essentially dimethylethynylcarbinol, and a hydroxyl-replacing chlorinating agent.

5. A process for the production of chloroisoprene, which comprises effecting reaction, in the liquid phase, in a reaction mixture comprising essentially dimethylethynylcarbinol, a hydroxyl-replacing chlorinating agent, and a mutual solvent.

6. A process for the production of chloroisoprene, which comprises effecting reaction, in the liquid phase, and at a temperature below 50° C., in a reaction mixture comprising essentially dimethylethynylcarbinol, a hydroxyl-replacing chlorinating agent, and a mutual solvent.

7. A process for the production of chloroisoprene, which comprises effecting reaction, in the liquid phase, and at a temperature below 50° C., in a reaction mixture in which the active components comprise essentially dimethylethynylcarbinol and hydrochloric acid.

8. A process for the production of chloroisoprene, which comprises effecting reaction, in the liquid phase, and at a temperature of 0° C.–20° C. in a reaction mixture comprising essentially dimethylethynylcarbinol, and aqueous hydrochloric acid.

9. A process for the production of chloroisoprene, which comprises effecting reaction, in the liquid phase, and at a temperature below 50° C., in a reaction mixture in which the active components comprise essentially dimethylethynylcarbinol, thionyl chloride and pyridine.

CHARLES D. HURD.